(12) United States Patent
Kaufman

(10) Patent No.: US 8,762,734 B2
(45) Date of Patent: Jun. 24, 2014

(54) BIOMETRIC PRESSURE GRIP

(75) Inventor: Glenn R. Kaufman, Kenneth City, FL (US)

(73) Assignee: Raytheon Company, Waltham, MA (US)

( * ) Notice: Subject to any disclaimer, the term of this patent is extended or adjusted under 35 U.S.C. 154(b) by 602 days.

(21) Appl. No.: 12/703,428

(22) Filed: Feb. 10, 2010

(65) Prior Publication Data

US 2011/0197270 A1    Aug. 11, 2011

(51) Int. Cl.
*G06F 21/00* (2013.01)

(52) U.S. Cl.
USPC ............... 713/186; 726/7; 726/17; 726/19; 382/115

(58) Field of Classification Search
CPC ... G06F 21/32; G06F 3/0414; G06K 9/00382; G06K 9/00892
See application file for complete search history.

(56) References Cited

U.S. PATENT DOCUMENTS

| | | | |
|---|---|---|---|
| 4,857,916 A * | 8/1989 | Bellin | 340/5.52 |
| 5,229,764 A | 7/1993 | Matchett et al. | |
| 5,774,571 A * | 6/1998 | Marshall | 382/119 |
| 5,991,431 A | 11/1999 | Borza et al. | |
| 6,131,464 A * | 10/2000 | Pare et al. | 73/714 |
| 6,343,140 B1 * | 1/2002 | Brooks | 382/115 |
| 6,539,101 B1 * | 3/2003 | Black | 382/124 |
| 6,563,940 B2 | 5/2003 | Recce | |
| 6,716,034 B2 | 4/2004 | Casanova, Jr. et al. | |
| 7,155,034 B1 | 12/2006 | Recce | |
| 2004/0031180 A1 | 2/2004 | Ivanov | |
| 2005/0057339 A1 * | 3/2005 | Ikehara et al. | 340/5.52 |
| 2005/0084138 A1 | 4/2005 | Inkster et al. | |
| 2006/0132315 A1 * | 6/2006 | Kurtz | 340/573.1 |
| 2006/0285725 A1 * | 12/2006 | Recce | 382/115 |
| 2008/0166028 A1 | 7/2008 | Turek et al. | |
| 2009/0174662 A1 | 7/2009 | Kato | |
| 2009/0289110 A1 | 11/2009 | Regen et al. | |
| 2010/0265170 A1 * | 10/2010 | Norieda | 345/156 |

OTHER PUBLICATIONS

R. Veldhuis, et al. "Biometric verification based on grip-pattern recognition," Proc. of SPIE-IS&T Electronic Imaging, 2004, Retrieved Jan. 7, 2013, Online: [http://proceedings.spiedigitallibrary.org/].*
J.A. Kauffman, et al. "Grip-Pattern Recognition for Smart Guns," ProRISC 2003, 14th Annual Workshop on Circuits, Systems and Signal Processing, pp. 379-384.*

(Continued)

*Primary Examiner* — Nadia Khoshnoodi
*Assistant Examiner* — Robert Leung
(74) *Attorney, Agent, or Firm* — Cantor Colburn LLP

(57) ABSTRACT

According to one embodiment, a method of authenticating a user includes receiving login credentials identifying a user. A plurality of pressure readings are received from a plurality of pressure sensors coupled to a biometric grip device. The plurality of pressure readings comprise a first biometric pressure reading from a first pressure sensor coupled to the biometric grip device and a second biometric pressure reading from a second pressure sensor coupled the biometric grip device. The first and second biometric pressure readings measure a first pressure exerted at the first pressure sensor and a second pressure exerted at the second pressure sensor. A neurological number is generated from the plurality of pressure readings. The user is authenticated by comparing the neurological number with a registered neurological number. If the neurological number matches the registered neurological number, the user is authorized to access a computer system coupled to the biometric grip device.

16 Claims, 3 Drawing Sheets

(56) References Cited

OTHER PUBLICATIONS

T. Takeda, et al. "Biometric Personal Authentication by One Step Foot Pressure Distribution Change by Load Distribution Sensor," FUZZ-IEEE 2009, Korea, Aug. 2009, pp. 906-910.*

Chen, Change L; Dr. Lai, Weng Kin; and Dr. Lim, Chee Peng; Development of Pressure-based Typing Biometrics Authentication System; http://ditigal.ni.com/worldwide/singapore.nsf/web/all (5 pages), downloaded Feb. 4, 2010.

Wahyudi, M; Ali, H.; and Salami, M.; Keystroke Pressured-Based Typing Biometrics Authentication System Using Support Vector Machines; http://www.springerlink.com (4 pages), downloaded Feb. 4, 2010.

Podio, Fernando and Dunn, Jeffrey S.; Biometric Authentication Technology: From the Movies to your Desktop; www.itl.nist.gove/div893/biometrics/Biometrics/fromthemoviees.pdf (8 pages), downloaded Feb. 4, 2010.

Elsadig, Wasil; Salami, et al. "Design and Evaluation of a Pressured-Based Biometric Authentication System"; www.hindawi.com/journals (17 pages), May 2008.

Sans Institute InfoSec Reading Room document, "Strengthening Authentication with Biometric Technology," SANS Institute, www.sans.org/.../authentication/strengthening_authentication_with_biometric (14 pages), 2003.

"Introduction to Biometrics Authentication," www.tns.com/biometrics.asp (6 pages), downloaded Feb. 10, 2010.

* cited by examiner

US 8,762,734 B2

BIOMETRIC PRESSURE GRIP

TECHNICAL FIELD

This disclosure generally relates to identification systems, and more particularly, to biometric pressure grips.

BACKGROUND

Biometrics systems may uniquely recognize humans based upon one or more intrinsic physical and/or behavioral traits. For example, biometric systems may use physical and/or behavioral traits as a form of verification and/or identification. Biometric verification and identification systems may be used in a variety of applications.

SUMMARY

According to one embodiment, a method of authenticating a user includes receiving login credentials identifying a user. A plurality of pressure readings are received from a plurality of pressure sensors coupled to a biometric grip device. The plurality of pressure readings comprise a first biometric pressure reading from a first pressure sensor coupled to the biometric grip device and a second biometric pressure reading from a second pressure sensor coupled the biometric grip device. The first and second biometric pressure readings measure a first pressure exerted at the first pressure sensor and a second pressure exerted at the second pressure sensor. A neurological number is generated from the plurality of pressure readings. The user is authenticated by comparing the neurological number with a registered neurological number. If the neurological number matches the registered neurological number, the user is authorized to access a computer system coupled to the biometric grip device.

Certain embodiments of the invention may provide one or more technical advantages. A technical advantage of one embodiment may include the capability to incorporate pressure biometrics into a computer input device. Yet other technical advantages may include the capability to continuously authenticate a user using pressure biometrics. Yet another technical advantage may include the capability to authenticate a user with or without using image scans of characteristic biometrics.

Although specific advantages have been enumerated above, various embodiments may include all, some, or none of the enumerated advantages. Additionally, other technical advantages may become readily apparent to one of ordinary skill in the art after review of the following figures and description.

BRIEF DESCRIPTION OF THE DRAWINGS

For a more complete understanding of embodiments of the disclosure and its advantages, reference is now made to the following detailed description, taken in conjunction with the accompanying drawings, in which.

DETAILED DESCRIPTION OF EXAMPLE EMBODIMENTS

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

Figure 1:
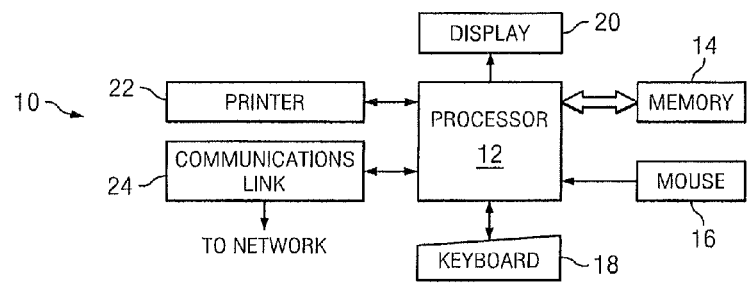
FIG. 1 shows an embodiment of a general purpose computer operable to perform one or more operations of various embodiments of the invention.

FIG. 1 presents an embodiment of a general purpose computer 10 operable to perform one or more operations of various embodiments of the invention. The general purpose computer 10 may generally be adapted to execute any of the well-known OS2, UNIX, Mac-OS, Linux, and Windows Operating Systems or other operating systems. The general purpose computer 10 in this embodiment comprises a processor 12, a memory 14, a mouse 16, a keyboard 18, and input/output devices such as a display 20, a printer 22, and a communications link 24. In other embodiments, the general purpose computer 10 may include more, less, or other component parts.

Several embodiments may include logic contained within a medium. Logic may include hardware, software, and/or other logic. Logic may be encoded in one or more tangible media and may perform operations when executed by a computer. Certain logic, such as the processor 12, may manage the operation of the general purpose computer 10. Examples of the processor 12 include one or more microprocessors, one or more applications, and/or other logic. Certain logic may include a computer program, software, computer executable instructions, and/or instructions capable being executed by the general purpose computer 10. In particular embodiments, the operations of the embodiments may be performed by one or more computer readable media storing, embodied with, and/or encoded with a computer program and/or having a stored and/or an encoded computer program. The logic may also be embedded within any other suitable medium without departing from the scope of the invention.

The logic may be stored on a medium such as the memory 14. The memory 14 may comprise one or more tangible, computer-readable, and/or computer-executable storage medium. Examples of the memory 14 include memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

The communications link 24 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding.

Although the illustrated embodiment provides one embodiment of a computer that may be used with other embodiments of the invention, such other embodiments may additionally utilize computers other than general purpose computers as well as general purpose computers without conventional operating systems. Additionally, embodiments of the invention may also employ multiple general purpose computers 10 or other computers networked together in a computer network. For example, multiple general purpose computers 10 or other computers may be networked through the Internet and/or in a client server network. Embodiments of the invention may also be used with a combination of separate computer networks each linked together by a private or a public network.

Figure 2A:
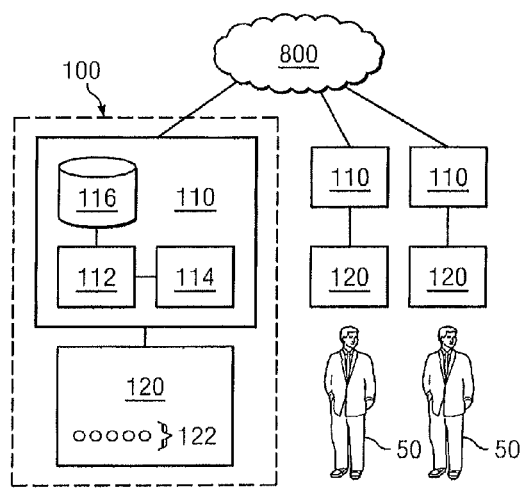
FIG. 2A shows a user authentication system according to one embodiment.

FIG. 2A shows a user authentication system 100 according to one embodiment. In operation, user authentication system 100 may authenticate user 50 to access a computer system, such as general purpose computer 10. Teachings of certain embodiments recognize that user authentication system 100 may authenticate user 50 to access any suitable computer system, regardless of whether the authentication system 100 is local to the computer system to be accessed. For example, in some embodiments, a user authentication system 100 operating on a first general purpose computer 10 may authenticate user 50 to access a second general purpose computer 10.

In the illustrated embodiment, user authentication system 100 features an authentication system 110 and a biometric grip device 120. Authentication system 110 may use inputs from biometric grip device 120 to authenticate user 50 to access a computer system, such as general purpose computer 10. In the illustrated embodiment, authentication system 110 features an authentication module 112, a credential manager 114, and a data store 116.

Biometric grip device 120 may include any device operable to receive biometric inputs from user 50. For example, in the illustrated embodiment, biometric grip device 120 features pressure sensors 122. Examples of biometric grip device 120 with pressure sensors 122 may include, but are not limited to, a mouse, a joystick, a palm pad controller, a remote control, a touch screen, or any other suitable device.

In the illustrated embodiment, multiple authentication systems 110 may communicate over one or more networks 800. Network 800 represents any suitable network operable to facilitate communications between user authentication systems 100. Examples of network 800 include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Teachings of certain embodiments recognize that operations of authentication system 110 may be distributed across multiple user authentication systems 110. As one non-limiting example, teachings of certain embodiments recognize that authentication system 110 may perform some operations without being coupled to biometric grip device 120. For example, in one embodiment, a first authentication system 110 may process biometric data received from a biometric grip device 120 coupled to a second authentication system 120.

In operation, according to one embodiment, authentication module 112 may receive inputs from biometric grip device 120. For example, in one embodiment, authentication module 112 may receive pressure readings from pressure sensors 122. In one non-limiting example, user 50 holds biometric grip device 120, pressure sensors 122 measure the forces user 50 exerts against biometric grip device 120, and authentication module 120 receives and processes pressure readings from pressure sensors 122.

In one example embodiment, authentication module 112 may store data regarding inputs from biometric grip device 120 in data store 116. For example, in one embodiment, authentication module 112 may store pressure reading data received from pressure sensor 122. In another example, authentication module 112 may receive pressure readings from pressure sensors 122, characterize the pressure readings according to a neurological number, and store the neurological number in data store 116.

In some embodiments, authentication module 112 may store data regarding inputs from biometric grip device 120 in data store 116 as part of an registration process. An registration process may include any process of registering a user. As one example, an registration process may include registering biometric data regarding the user received from biometric grip device 120. Teachings of certain embodiments recognize that registered biometric data may be used to later confirm the identity of the user at a later time by comparing the registered biometric data with new biometric data received at the later time.

For example, in some embodiments, authentication module 112 compares inputs from biometric grip device 120 to data stored in data store 116. For example, in the exemplary embodiment explained above, authentication module 112 may store data regarding inputs from biometric grip device 120 in data store 116 as part of an registration process. After the registration process, authentication module 112 may compare new inputs from biometric grip device 120 to the inputs received as part of the registration process.

In some embodiments, authentication module 112 may notify credential manager 114 after verifying that inputs from biometric grip device 120 match data stored in data store 116. In this example, credential manager 114 may manage access to one or more general purpose computers 10. If, for example, the inputs from biometric grip device 120 match data stored in data store 116, authentication module 112 may instruct credential manager 114 to grant user 50 credentials to access one or more general purpose computers 10.

In some embodiments, authentication module 112 may continuously or periodically reauthenticate user 50. For example, in one embodiment, authentication module 112 may receive a second set of inputs from biometric grip device 120. Authentication module 112 may then match this second set of inputs to data stored in data store 116. If the second set of inputs no longer matches data stored in data store 116, then authentication module 112 may instruct credential manager 114 to modify and/or revoke the credentials of user 50.

In some embodiments, inputs may match for purposes of authentication even if the inputs do not exactly match data stored in data store 116. As one non-limiting example, inputs may match if they fall within an acceptable level of tolerance with data stored in data store 116.

Figure 2B:
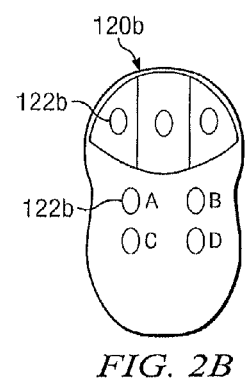
FIGS. 2B, 2C, and 2D show example biometric grip devices according to various embodiments.
Figure 2C:
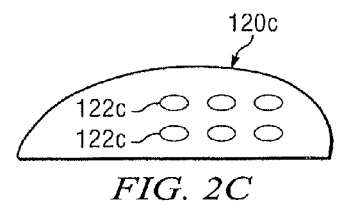
Figure 2D:
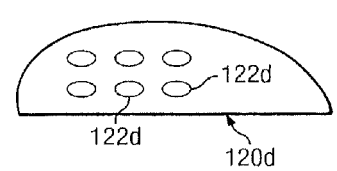

FIGS. 2B, 2C, and 2D show example biometric grip devices 120b, 120c, and 120d according to various embodiments. In these examples, biometric grip devices 120b, 120c, and 120d resemble a computer mouse. However, teachings of certain embodiments recognize that a biometric grip device may include any device operable to receive biometric inputs from a user, such as user 50.

In the illustrated examples, biometric grip devices 120b, 120c, and 120d feature pressure sensors 122b, 122c, and 122d, respectively. In one non-limiting example, a user, such as user 50, holds biometric grip device 120b, and pressure sensors 122b measure the forces user 50 exerts against biometric grip device 120b. Teachings of certain embodiments recognize that different users may hold biometric grip device 120b in different manners and with different forces, and that these differences may be measured and analyzed as a biometric input.

In the illustrated examples, pressure sensors 122b, 122c, and 122d are arranged on a common surface of their respective biometric grip devices. For example, pressure sensors 122b are located on the top of biometric grip device 120, pressure sensors 122c are located on the right side (relative to the user) of biometric grip device 120c, and pressure sensors 122d are located on the left side (relative to the user) of biometric grip device 120d. Teachings of certain embodiments recognize that multiple pressure sensors on a common surface may improve biometric accuracy. However, embodiments are not limited to pressure sensors on only one common surface, but rather pressure sensors may be arranged and placed in any suitable manner.

Figure 3A:
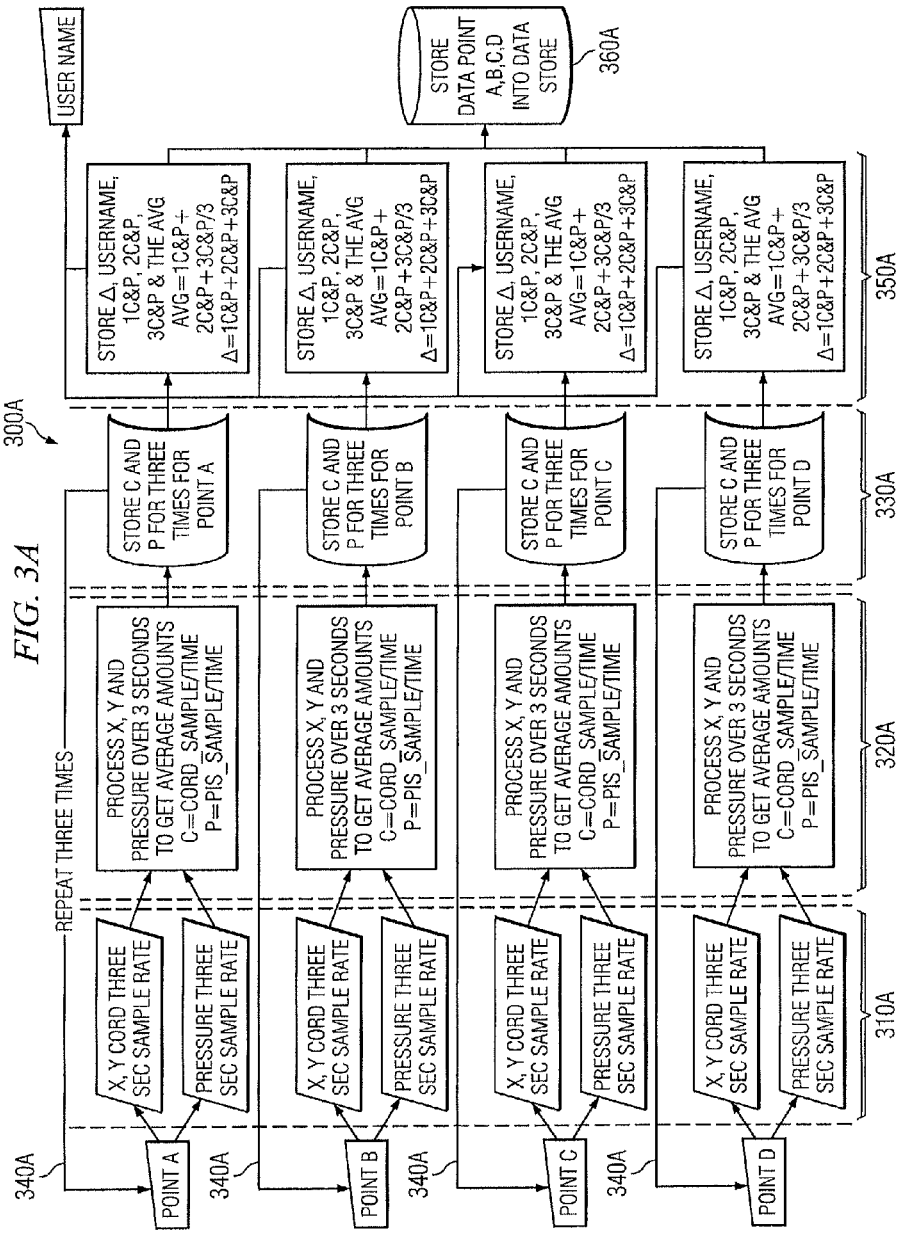
FIGS. 3A and 3B show example methods of registering and authenticating biometric inputs according to one embodiment.
Figure 3B:
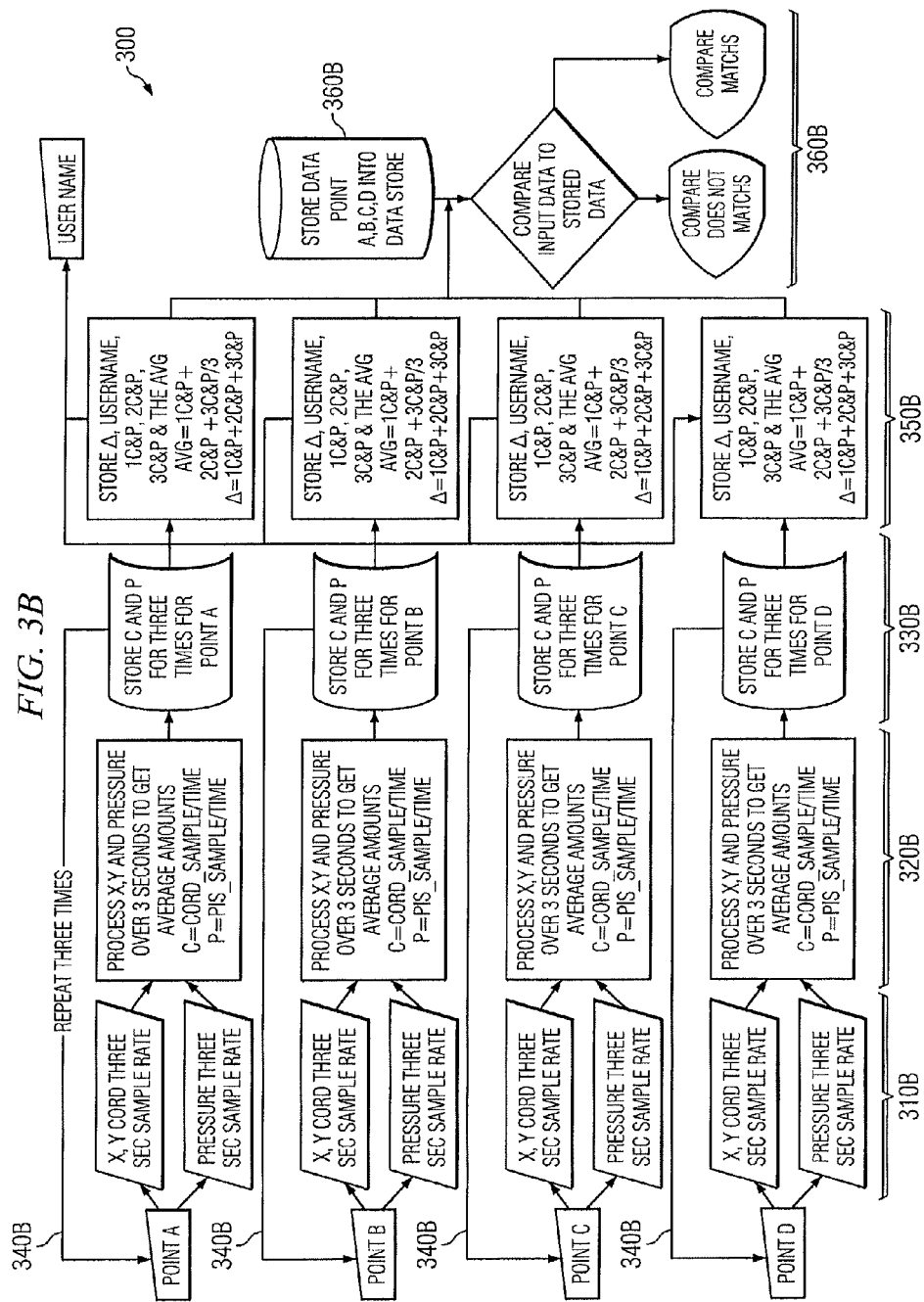

FIGS. 3A and 3B show example methods 300A and 300B of registering and authenticating biometric inputs according to one embodiment. FIG. 3A shows an example method 300A of registering a user into a biometric authentication system. In one example embodiment, user authentication system 100 may use method 300A to register biometrics provided by user 50. FIG. 3B shows an example method 300B of comparing received biometric data to registered biometric data. In one example embodiment, user authentication system 100 may use method 300A to compare new biometric data to previously-received biometric data that has been registered to user 50.

In this example embodiment, methods 300A and 300B describe methods of processing pressure sensor data from four pressure sensors, labeled as points A, B, C, and D. For illustrative purposes, points A, B, C, and D are labeled by reference to pressure sensors 122b on FIG. 2B. However, teachings of certain embodiments recognize that methods 300A and 300B may include more or fewer pressure sensor points that may be arranged and placed in any suitable manner.

In the example method 300A, a pressure reading and the X-Y coordinate are recorded for each point at step 310A. In some embodiments, the pressure reading and the X-Y coordinate may be recorded over a specified time period, such as three seconds. At step 320A, the pressure readings and/or X-Y coordinates are averaged the specified time period (in this example, three seconds). At step 330A, the averaged pressure readings and X-Y coordinates are stored, such as in a data store such as data store 116. At step 340A, steps 310A, 320A, and 330A are repeated from the same pressure points. In the illustrated example, steps 310A, 320A, and 330A are repeated three times at step 340A.

At step 350A, the following information is recorded: (1) the averaged pressure readings and X-Y coordinates from each iteration of step 330A; (2) the average of the recorded averaged pressure readings and X-Y coordinates from item (1), above; (3) the sum of the recorded averaged pressure readings and X-Y coordinates from item (1), above; and (4) the name or other identification information of user 50. At step 360A, the data recorded at step 350A for each data point is then stored in a data store, such as data store 116.

In the example method 300B, a pressure reading and the X-Y coordinate are recorded for each point at step 310B. In some embodiments, the pressure reading and the X-Y coordinate may be recorded over a specified time period, such as three seconds. At step 320B, the pressure readings and/or X-Y coordinates are averaged the specified time period (in this example, three seconds). At step 330B, the averaged pressure readings and X-Y coordinates are stored, such as in a data store such as data store 116. At step 340B, steps 310B, 320B, and 330B are repeated from the same pressure points. In the illustrated example, steps 310B, 320B, and 330B are repeated three times at step 340B.

At step 350B, the following information is recorded: (1) the averaged pressure readings and X-Y coordinates from each iteration of step 330B; (2) the average of the recorded averaged pressure readings and X-Y coordinates from item (1), above; (3) the sum of the recorded averaged pressure readings and X-Y coordinates from item (1), above; and (4) the name or other identification information of user 50.

At step 360B, the data recorded at step 350B is compared to the data recorded from step 350A and stored at step 360A. Step 360B may determine whether data from step 350B matches data from step 350A and thus whether data from step 350B matches the user from method 300A.

Matching of data from steps 350A and 350B may be performed in any suitable manner. In one example embodiment, data from points A, B, C, and D may be characterized by a neurological number. A neurological number may include any number that is calculated from biometric inputs. As one non-limiting example, a neurological number may be calculated from data retrieved from points A, B, C, and D.

For example, in one illustrative embodiment, matching of data from steps 350A and 350B may include comparing the sums of the pressures measured at points A, B, C, and D, and then determining whether these sums of pressures match within a level of tolerance. In another example embodiment, a local neurological number may be generated for each pressure sensor as a function of the biometric pressure reading at that pressure sensor and the location of that pressure sensor on the biometric grip device. These local neurological numbers may be added to form a compiled neurological number. The amplitude of this compiled neurological number may be adjusted, such as to fit within an acceptable output scale like $-1<N<1$ or $0<N<1$. Adjusted and compiled neurological numbers from steps 350A and 350B may be compared to determine if the neurological numbers match within an allowable tolerance.

As another example, the neurological number may account for location of each pressure sensor. For example, in one embodiment, user 50 may provide a registered biometric sample using the biometric grip device 120b from FIG. 2B. In this example, user 50 may wish to access a computer system connected to a different biometric grip device, such as biometric grip device 120c from FIG. 2C. Teachings of certain embodiments recognize that neurological numbers may be calculated from biometric grip devices 120b and 120c such that pressure data retrieved from biometric grip device 120b may be compared to biometric grip device 120c.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A method of authenticating a user, comprising:
receiving login credentials identifying a user;
receiving a plurality of pressure readings from a plurality of pressure sensors coupled to a first biometric grip device, the plurality of pressure readings comprising a first biometric pressure reading from a first pressure sensor coupled to the first biometric grip device and a second biometric pressure reading from a second pressure sensor coupled the first biometric grip device, the first biometric pressure reading measuring a first pressure exerted by the user on the first biometric grip device at the first pressure sensor, the second biometric pressure reading measuring a second pressure exerted by the user on the first biometric grip device at the second pressure sensor;
generating a local neurological number for each of the first and second pressure sensors, wherein a local neurological number is a function of a pressure reading at a pressure sensor and a location of the selected pressure sensor;
generating a compiled neurological number from a summation of the local neurological numbers from the first pressure sensor and the second pressure sensor;
obtaining a registered neurological number that is generated using a second biometric grip device different than the first biometric grip device, the second biometric grip device having a second plurality of pressure sensors for obtaining a second plurality of pressure readings comprising a third biometric pressure reading from a third pressure sensor coupled to the second biometric grip device and a fourth biometric pressure reading from a fourth pressure sensor coupled the second biometric grip device, wherein the location of the third and fourth pressure sensors on the second biometric grip device is different than the location of the first and second pressure sensors on the first biometric grip device and the registered neurological number is generated as a function of the location of the third and fourth pressure sensors on the second biometric grip device and biometric pressure readings at the third and fourth pressure sensors;
comparing the compiled neurological number with the registered neurological number; and
authenticating the user when the compiled neurological number matches the registered neurological number within a selected tolerance.

2. The method of claim 1, further comprising periodically reauthenticating the user by:
receiving a second set of plurality of pressure readings from the first biometric grip device; generating a second compiled neurological number from the second set of plurality of pressure readings; and
authenticating the user by comparing the second compiled neurological number with the registered neurological number.

3. The method of claim 1, wherein the biometric grip device is a computer mouse.

4. The method of claim 1, wherein the plurality of pressure readings comprises at least three biometric pressure readings.

5. The method of claim 1, wherein the first and second biometric pressure sensors are located on a common surface of the first biometric grip device.

6. The method of claim 1, wherein generating the neurological number from the plurality of pressure readings further comprises: generating a local neurological number for each pressure sensor of the plurality of pressure sensors as a function of the biometric pressure reading at that pressure sensor and the location of that pressure sensor on the first biometric grip device; summing each local neurological number for each pressure sensor of the plurality of pressure sensors to form a compiled neurological number; and adjusting an amplitude of the compiled neurological number to form the neurological number, wherein adjusting the amplitude scales the compiled neurological number to an acceptable output scale.

7. The method of claim 6, wherein the first and second biometric pressure sensors are located on a common surface of the first biometric grip device; and the location of the pressure sensor on the first biometric grip device is measure in two-dimensional coordinates relative to a reference coordinate on the common surface.

8. The method of claim 1, wherein the compiled neurological number matches the registered neurological number if the neurological number is within an acceptable level of tolerance with the registered neurological number.

9. An authentication system, comprising:
a first biometric grip device comprising a plurality of pressure sensors, the plurality of pressure sensors operable to record a plurality of pressure readings, the plurality of pressure readings comprising a first biometric pressure reading from a first pressure sensor coupled to the biometric grip device and a second biometric pressure reading from a second pressure sensor coupled the biometric grip device, the first biometric pressure reading measuring a first pressure exerted by the user on the biometric grip device at the first pressure sensor, the second biometric pressure reading measuring a second pressure exerted by the user on the biometric grip device at the second pressure sensor;
a second biometric grip device having a second plurality of pressure sensors for obtaining a second plurality of pressure readings, the second plurality of pressure readings comprising a third biometric pressure reading from a third pressure sensor coupled to the second biometric grip device and a fourth biometric pressure reading from a fourth pressure sensor coupled the second biometric grip device, the third biometric pressure reading measuring a third pressure exerted by the user on the second biometric grip device at the third pressure sensor, the fourth biometric pressure reading measuring a fourth pressure exerted by the user on the second biometric grip device at the fourth pressure sensor, wherein: the location of the third and fourth pressure sensors on the second biometric grip device is different than the location of the first and second pressure sensors on the biometric grip device;
and
logic encoded in one or more computer-readable storage media for execution and when executed operable to:
receive login credentials identifying a user,
receive the plurality of pressure readings from the plurality of pressure sensors,
generate a local neurological number for each of the first and second pressure sensors, wherein a local neurological number is a function of a pressure reading at a pressure sensor and a location of the selected pressure sensor,
generate a compiled neurological number from a summation of the local neurological numbers from the first pressure sensor and the second pressure sensor,
generate a registered neurological number from the second plurality of pressure readings as a function the location of the third and fourth pressure sensors at the second biometric grip device and the biometric pressure readings at the third and fourth pressure sensors, compare the compiled neurological number with the registered neurological number, and authenticate the user when the compiled neurological number matches the registered neurological number within a selected tolerance.

10. The authentication system of claim 9, wherein the logic, when executed, is further operable to periodically reauthenticate the user by: receiving a second set of plurality of pressure readings from the first biometric grip device; generating a second compiled neurological number from the second set of plurality of pressure readings; and authenticating the user by comparing the second compiled neurological number with the registered neurological number.

11. The authentication system of claim 9, wherein the biometric grip device is a computer mouse.

12. The authentication system of claim 9, wherein the plurality of pressure readings comprises at least three biometric pressure readings.

13. The authentication system of claim 9, wherein the first and second biometric pressure sensors are located on a common surface of the first biometric grip device.

14. The authentication system of claim 9, wherein the logic when executed is further operable to generate the compiled neurological number from the plurality of pressure readings by:

generating a local neurological number for each pressure sensor of the plurality of pressure sensors as a function of the biometric pressure reading at that pressure sensor and the location of that pressure sensor on the first biometric grip device; summing each local neurological number for each pressure sensor of the plurality of pressure sensors to form a compiled neurological number; and adjusting an amplitude of the compiled neurological number to form the compiled neurological number, wherein adjusting the amplitude scales the compiled neurological number to an acceptable output scale.

15. The authentication system of claim 14, wherein: the first and second biometric pressure sensors are located on a common surface of the first biometric grip device; and the location of the pressure sensor on the first biometric grip device is measured in two-dimensional coordinates relative to a reference coordinate on the common surface.

16. The authentication system of claim 9, wherein the compiled neurological number matches the registered neurological number when the compiled neurological number is within an acceptable level of tolerance with the registered neurological number.

* * * * *